US012443245B2

(12) United States Patent
Noh et al.

(10) Patent No.: US 12,443,245 B2
(45) Date of Patent: Oct. 14, 2025

(54) ELECTRONIC DEVICE INCLUDING TOUCHPAD ASSEMBLY

(71) Applicant: Samsung Electronics Co., Ltd., Suwon-si (KR)

(72) Inventors: Hwanmyung Noh, Suwon-si (KR); Younggwon Koo, Suwon-si (KR); Jongheon Kim, Suwon-si (KR); Youngshin Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 18/162,981

(22) Filed: Feb. 1, 2023

(65) Prior Publication Data

US 2023/0376083 A1    Nov. 23, 2023

Related U.S. Application Data

(63) Continuation of application No. PCT/KR2023/000813, filed on Jan. 17, 2023.

(30) Foreign Application Priority Data

May 23, 2022  (KR) .................. 10-2022-0062962
Jul. 5, 2022   (KR) .................. 10-2022-0082322

(51) Int. Cl.
  *G06F 1/16*    (2006.01)
  *G06F 3/0354*  (2013.01)
(52) U.S. Cl.
  CPC .......... *G06F 1/169* (2013.01); *G06F 3/03547* (2013.01)

(58) Field of Classification Search
  CPC .............................. G06F 1/169; G06F 3/03547
  See application file for complete search history.

(56) References Cited

U.S. PATENT DOCUMENTS

| 2006/0109254 | A1 | 5/2006  | Akieda et al. |
| 2008/0264700 | A1 | 10/2008 | Yoon |
| 2016/0091972 | A1 | 3/2016  | Patel et al. |
| 2016/0162030 | A1 | 6/2016  | Patel et al. |

(Continued)

FOREIGN PATENT DOCUMENTS

| KR | 10-1586313 B1    | 1/2016 |
| KR | 10-2017-0048637 A | 5/2017 |

(Continued)

OTHER PUBLICATIONS

International Search Report with Written Opinion and English translation dated Apr. 19, 2023; International Appln. No. PCT/KR2023/000813.

*Primary Examiner* — Afroza Chowdhury
(74) *Attorney, Agent, or Firm* — Jefferson IP Law, LLP

(57) ABSTRACT

An electronic device is provided. The electronic device includes a housing including a seating recess formed in one surface, a touchpad assembly disposed in the seating recess on one surface of the housing and configured to detect a user input, at least one first driving unit disposed on the touchpad assembly and at least partially received in the housing, and at least one second driving unit disposed on an inner surface of the housing and at least partially facing the first driving unit. The first driving unit may be configured to receive an electrical signal to, together with the second driving unit, move or vibrate the touchpad assembly.

19 Claims, 10 Drawing Sheets

(56) References Cited

U.S. PATENT DOCUMENTS

| | | |
|---|---|---|
| 2017/0003718 A1 | 1/2017 | Farahani et al. |
| 2018/0059794 A1 | 3/2018 | Nakamura et al. |
| 2018/0081483 A1 | 3/2018 | Camp et al. |
| 2018/0120940 A1 | 5/2018 | Kessler et al. |
| 2018/0181200 A1 | 6/2018 | Olien et al. |
| 2019/0056837 A1 | 2/2019 | Datta et al. |
| 2019/0187793 A1 | 6/2019 | Schreurs et al. |
| 2020/0133397 A1 | 4/2020 | Mori |
| 2021/0081045 A1* | 3/2021 | Mukherjee ............ G06F 3/0414 |
| 2022/0011868 A1* | 1/2022 | Junus ................... G06F 3/045 |

FOREIGN PATENT DOCUMENTS

| | | |
|---|---|---|
| KR | 10-2386694 B1 | 4/2022 |
| KR | 10-2023-0045824 A | 4/2023 |

* cited by examiner

ELECTRONIC DEVICE INCLUDING TOUCHPAD ASSEMBLY

CROSS-REFERENCE TO RELATED APPLICATION(S)

This application is a continuation application, under § 365(c), of an International application No. PCT/KR2023/000813, filed on Jan. 17, 2023, which is based on and claims the benefit of a Korean patent application number 10-2022-0062962, filed on May 23, 2022, in the Korean Intellectual Property Office, and of a Korean patent application number 10-2022-0082322, filed on Jul. 5, 2022, in the Korean Intellectual Property Office, the disclosure of each of which is incorporated by reference herein in its entirety.

TECHNICAL FIELD

The disclosure relates to an electronic device. More particularly, the disclosure relates to an electronic device including a touchpad assembly.

BACKGROUND ART

Typically, 'electronic device' collectively refers to devices that can be carried by a user, allowing him or her to enjoy telecommunications functionality, such as voice call or short messaging service, multimedia functionality, such as playing music or video, or other entertainment functions, such as playing video games. Such electronic devices may include desktop computers at home or office and laptop computers with more space availability and portability in general use environments including homes or offices. In various types of electronic devices, graphic user interfaces have significantly enhanced the convenience of user input. With the introduction of a pressure sensitive or capacitive touch input method, user input schemes are diversified, such as directly manipulating the screen of an electronic device.

Graphical user interfaces and touch input schemes have contributed significantly to wide use of small/portable electronic devices, such as smartphones and tablet personal computers (PCs), and are gradually being applied to laptop computers and larger displays. A small electronic device may be integrated with a touch panel to implement an intuitive input scheme, and a larger display-equipped electronic device, e.g., a laptop computer, may have a touchpad assembly (or track pad assembly) separately provided from the display. For example, a touchpad assembly synchronized with a display (or graphic user interface) may be disposed independently of the display according to an actual use environment.

The above information is presented as background information only to assist with an understanding of the disclosure. No determination has been made, and no assertion is made, as to whether any of the above might be applicable as prior art with regard to the disclosure.

DISCLOSURE

Technical Problem

The touchpad assembly for detecting or receiving user input may typically be exposed to the outside of the electronic device, and the structure in which the touchpad assembly is disposed to be exposed may hinder the strength or structural stability of the electronic device. For example, when an opening for disposing a touchpad assembly on the housing of the electronic device is formed as disclosed in Korean Patent No. 10-1391759 (registered on Apr. 28, 2014, U.S. Pat. No. 8,552,991 issued on Oct. 8, 2013), the strength of the housing may deteriorate.

Aspects of the disclosure are to address at least the above-mentioned problems and/or disadvantages and to provide at least the advantages described below. Accordingly, an aspect of the disclosure is to provide an electronic device that includes a touchpad assembly to provide a convenient use environment.

Another aspect of the disclosure is to provide an electronic device that includes a touchpad assembly and has enhanced strength and/or enhanced structural stability.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a seating recess formed in one surface, a touchpad assembly disposed in the seating recess on one surface of the housing and configured to detect a user input, at least one first driving unit disposed on the touchpad assembly and at least partially received in the housing, and at least one second driving unit disposed on an inner surface of the housing and at least partially facing the at least one first driving unit. The at least one first driving unit may be configured to receive an electrical signal to, together with the at least one second driving unit, move or vibrate the touchpad assembly.

In accordance with another aspect of the disclosure, an electronic device is provided. The electronic device includes a first housing including a seating recess formed in one surface, a second housing including a display disposed on one surface and rotatably coupled to the first housing to open/close one surface of the first housing, a touchpad assembly disposed in the seating recess on one surface of the first housing and configured to detect a user input, a first driving unit disposed on the touchpad assembly and including at least one coil at least partially received in the first housing, a second driving unit including a magnetic substance and disposed on an inner surface of the first housing to at least partially face the first driving unit, and a processor configured to apply an electrical signal to the first driving unit based on a user input detected by the touchpad assembly. The first driving unit may be configured to receive an electrical signal to, together with the second driving unit, move or vibrate the touchpad assembly.

Advantageous Effects

According to an embodiment of the disclosure, a touchpad assembly may be disposed in a seating recess in one surface of the housing. For example, it is possible to suppress or prevent deterioration of the strength of the housing and enhance the structural stability of the electronic device and/or housing in disposing the touchpad assembly. In an embodiment, the touchpad assembly may be synchronized with the graphic user interface, providing convenient user input in the electronic device. Other various effects may be provided directly or indirectly in the disclosure.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly indicates otherwise. Thus, for example, reference to "a component surface" includes reference to one or more of such surfaces.

Figure 1:
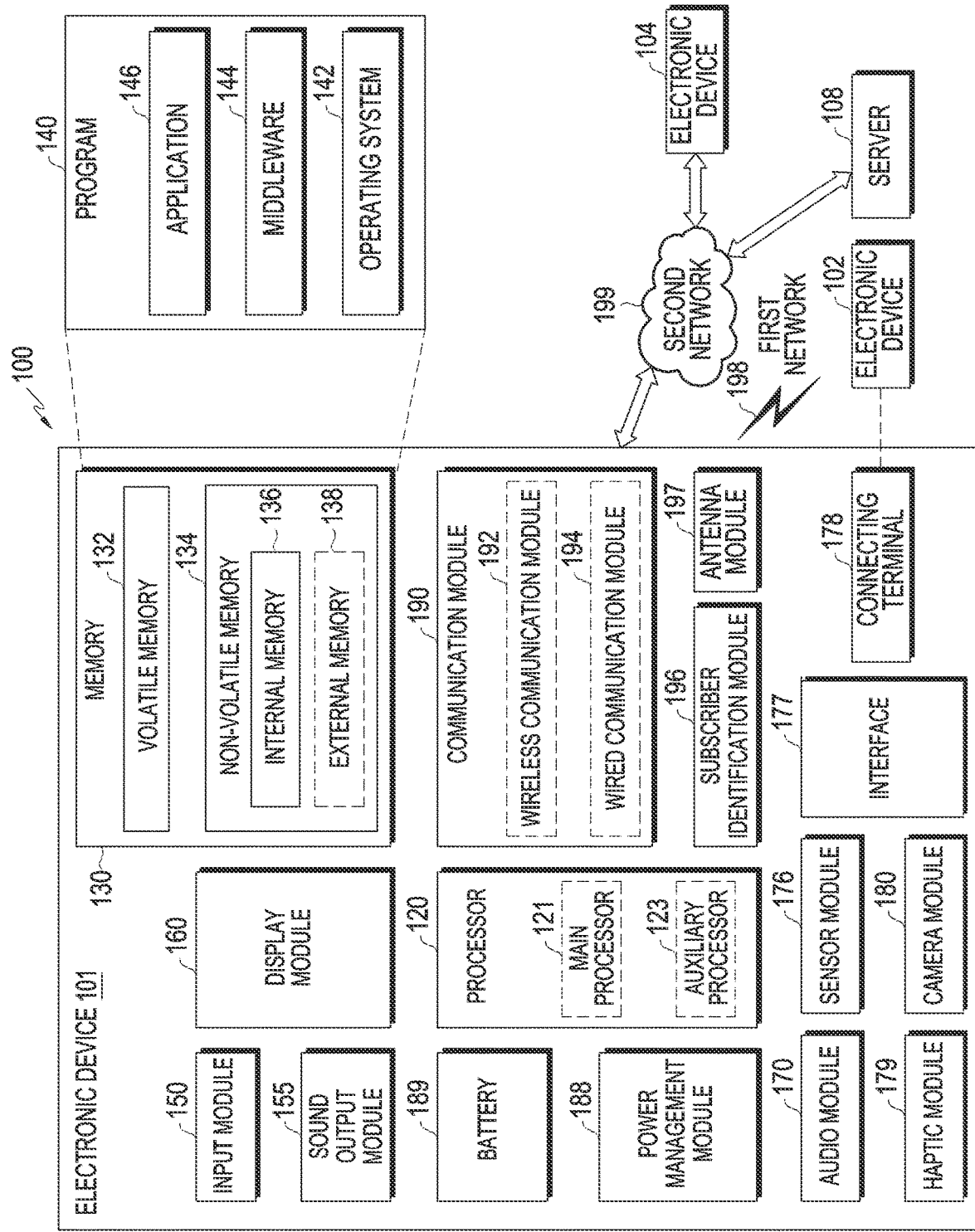
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 includes an internal memory 136 and may further include an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102 or 104, or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment of the disclosure may be one of various types of devices. The electronic devices may include, for example, a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following detailed description, a length direction, a width direction, and/or a thickness direction of the electronic device (e.g., the first housing 201 of FIG. 2) may be mentioned and may be understood as a 'Y-axis direction,' 'X-axis direction', and/or 'Z-axis direction,' respectively. In an embodiment, 'negative/positive (−/+)' may be mentioned together with the Cartesian coordinate system exemplified in the drawings with respect to the direction in which the component is oriented. For example, the front surface (or upper surface) of the electronic device or housing may be defined as a 'surface facing in the +Z direction,' and the rear surface (or lower surface) may be defined as a 'surface facing in the −Z direction'. In an embodiment, the side surface of the electronic device or housing may include an area facing in the +X direction, an area facing in the +Y direction, an area facing in the −X direction, and/or an area facing in the −Y direction. In another embodiment, the 'X-axis direction' may mean including both the '−X direction' and the '+X direction'. It should be noted that the directions are so defined with respect to the Cartesian coordinate system shown in the drawings for the sake of brevity of description, and the description of these directions or components do not limit an embodiment(s) of the disclosure. For example, in FIG. 2, the Cartesian coordinate system exemplifies the length direction, the width direction and/or the thickness direction of the first housing 201, and the length direction, width direction and/or thickness direction of the second housing 202 may be understood as different from the Cartesian coordinate system depending on the inclined angle with respect to the first housing 201.

Figure 2:
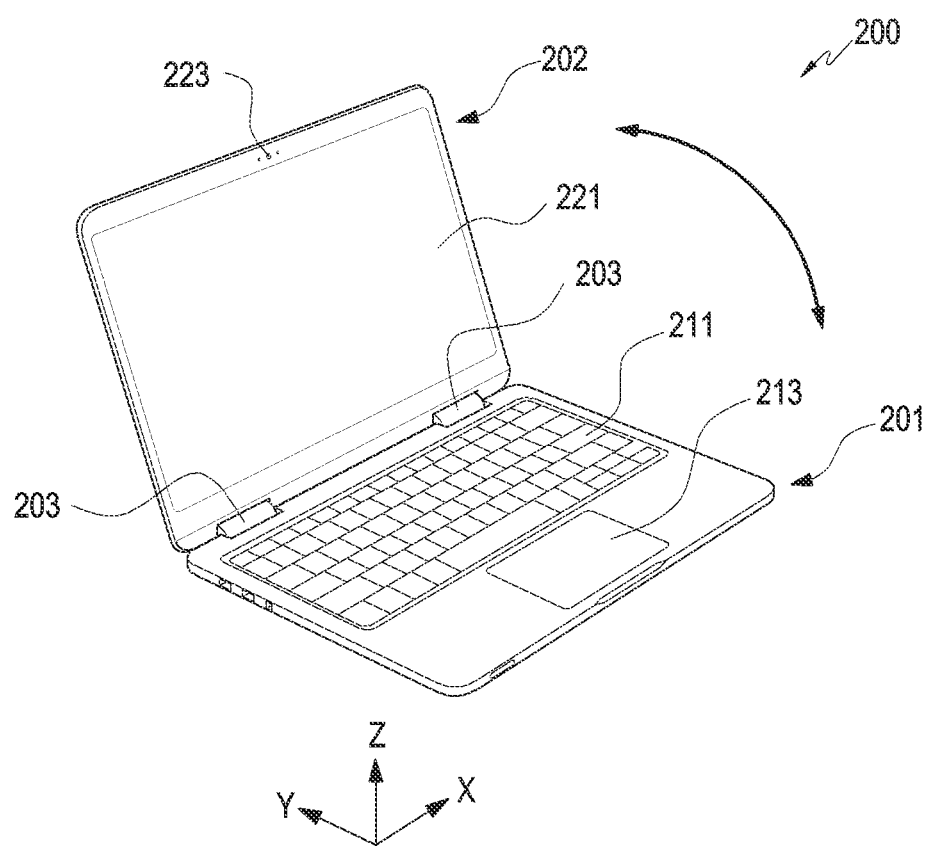
FIG. 2 is a perspective view illustrating an electronic device according to an embodiment of the disclosure.

FIG. 2 is a perspective view illustrating an electronic device 200 according to an embodiment of the disclosure.

Referring to FIG. 2, the electronic device 200, e.g., as a laptop computer, may include a first housing 201 and a second housing 202 rotatably coupled to each other. For example, the first housing 201 and the second housing 202 are rotatably coupled through the hinge device 203 to be unfolded from the position in which they are folded to face each other to an opened position in which they are inclined at an arbitrary angle with respect to each other. In an embodiment, the first housing 201 and the second housing 202 may be unfolded in the position in which they form 180 degrees therebetween or be folded, with the keyboard 211 and display device 221 (e.g., the display module 160 of FIG. 1) of FIG. 2 facing in opposite directions.

According to an embodiment, a main circuit board on which various components, such as a processor (e.g., the processor 120 of FIG. 1), a memory (e.g., the memory 130 of FIG. 1), a communication module (e.g., the communication module 190 of FIG. 1), and an interface (e.g., the interface 177 of FIG. 1), are mounted and/or a battery (e.g., the battery 189 of FIG. 1) may be embedded in the first housing 201. In an embodiment, an input device (e.g., the input module 150 of FIG. 1), such as a keyboard 211 and/or a touchpad 213 (e.g., the touchpad assembly 304 of FIG. 3) may be provided on one surface (e.g., the upper surface facing in the +Z direction) of the first housing 201. For example, if the first housing 201 and the second housing 202 are folded to face each other, the keyboard 211 or the touchpad 213 may be concealed or closed, and the second housing 202 may be unfolded from the first housing 201 at a designated angle or more, opening the keyboard 211 or the touchpad 213. Although not assigned a reference numeral, a connecting terminal(s) (e.g., the connecting terminal 178 of FIG. 1) for connecting with other external devices, such as a power connector, a USB connector, and an HDMI connector, may be disposed on a side surface(s) of the first housing 201.

According to an embodiment, the display device 221 and/or the camera device 223 (e.g., the camera module 180 of FIG. 1) may be disposed on one surface (e.g., the surface facing in the −Z direction in the folded state) of the second housing 202. In an embodiment, the display device 221 may include a touch panel or a digitizer, so that the display device 221 may be utilized as an input device, along with the keyboard 211, while outputting visual information. In an embodiment, when the electronic device 200 includes the touchpad 213, the touch panel or the digitizer may be omitted. The camera device 223 may perform capture in the screen output direction of the display device 221 and detect information for user authentication (e.g., face recognition) or use environment (e.g., illuminance) of the electronic device 200 according to a program or command stored in the electronic device 200.

Figure 3:
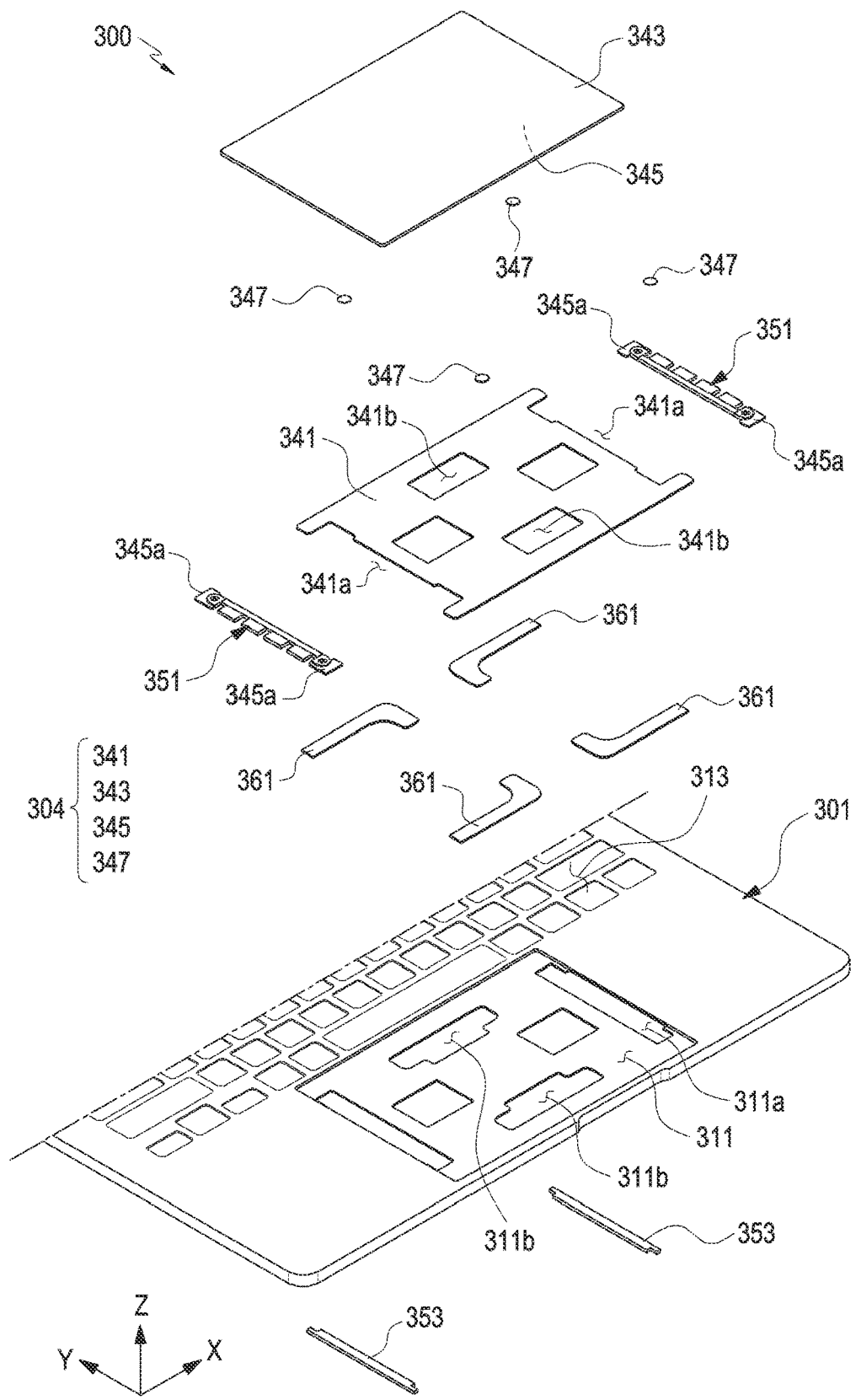
FIG. 3 is an exploded perspective view illustrating an electronic device according to an embodiment of the disclosure.

FIG. 3 is an exploded perspective view illustrating an electronic device 300 according to an embodiment of the disclosure.

Referring to FIG. 3, an electronic device 300 (e.g., the electronic device 101 or 200 of FIG. 1 or 2) may include a housing 301 (e.g., the first housing 201 of FIG. 2), a touchpad assembly 304 (e.g., the touchpad 213 of FIG. 2), and/or a driving unit(s) 351 and 353 (e.g., the haptic module 179 of FIG. 1). The touchpad assembly 304 may be disposed on one surface (e.g., the surface facing in the +Z direction) of the housing 301 to detect user input. For example, the touchpad assembly 304 may detect at least one of the user's touch/press, drag, hovering, pinch-zoom, sweep, and/or gesture and, based thereon, generate an input signal.

In an embodiment, the driving unit(s) 351 and 353 may receive an electrical signal to generate a driving force (e.g., attractive or repulsive force between the driving units 351 and 353) to vibrate the touchpad assembly 304. For example, the processor (e.g., the processor 120 of FIG. 1) may detect the user input using the touchpad assembly 304 and may apply an electrical signal to the driving unit(s) 351 and 353 while executing a command based on the detected user input. In an embodiment, the vibration of the touchpad assembly 304 may be perceived substantially through tactile (or auditory) sensations, and the driving unit(s) 351 and 353 may generate a driving force in an input operation based on the user's direct contact. In an embodiment, the processor 120 may be configured to provide vibration feedback or auditory feedback by applying an electrical signal to the driving unit(s) 351 and 353 when the touchpad assembly 304 detects a user input that is not a direct contact, such as hovering or a gesture.

According to an embodiment, the housing 301 is a structure that substantially provides the appearance of the electronic device 300 and may include a seating recess 311 (or placement recess) formed in one surface (e.g., the surface facing in the +Z direction) and a keyboard area 313 disposed on one side of the seating recess 311. In an embodiment, the housing 301 of FIG. 3 may be the exemplified plate forming the front surface of the first housing 201 of FIG. 2. For example, the structure shown as housing 301 in FIG. 3 may be a front plate. The electronic device 300 of FIG. 3 may further include a rear plate (not shown) coupled to the rear surface of the housing 301.

According to an embodiment, the seating recess 311 may be a recess depressed to the depth corresponding to the thickness of the touchpad assembly 304, from the outer surface of the housing 301, for example. For example, the touchpad assembly 304 may be received in the seating recess 311. The outer surface (e.g., the surface exposed to the outside of the housing 301 in the Z-axis direction) of the touchpad assembly 304 may be disposed on substantially the same plane as the outer surface (e.g., the surface facing in the +Z direction, substantially the upper surface of the housing 301) of the housing 301. However, an embodiment of the disclosure is not limited thereto, and in an actually manufactured product, as moved inward of the seating recess 311 or deformed when external force is applied, the outer surface of the touchpad assembly 304 may not be aligned to the same plane as the outer surface of the housing 301.

According to an embodiment, the electronic device 300 and/or the housing 301 may further include a plurality of holes 311a and 311b formed through the housing 301 over the seating recess 311. The plurality of holes 311a and 311b may include at least one accommodation hole(s) 311a and at least one dummy hole(s) 311b formed adjacent to the edge of, e.g., the seating recess 311. In the illustrated embodiment, a pair of accommodation holes 311a are respectively formed at two opposite edges of the seating recess 311, and a pair of dummy holes 311b are disposed on the seating recess 311 in the area between the accommodation holes 311a, for example. Although not assigned a reference numeral, additional holes or recesses may be disposed on the seating recess 311, and the additional holes or recesses may provide spaces for receiving other structures in assembling the touchpad assembly 304 or for avoiding interference with other structures.

According to an embodiment, the keyboard area 313 is an area where, e.g., the keyboard 211 of FIG. 2 is disposed and may include an array of a plurality of through holes. For example, keys provided as the keyboard 211 of FIG. 2 may be disposed in any one of the holes of the keyboard area 313. In an embodiment, the keyboard 211 of FIG. 2 may be implemented in a touch type in which case the keyboard area 313 may be deformed into a substantially flat plate shape or a recess shape similar to the seating recess 311.

According to an embodiment, the touchpad assembly 304 may include a fixing plate 341, a cover plate 343, a circuit board 345, and/or a cushion tape 347. The fixing plate 341 may be, e.g., a bracket or assembly base formed of metal or synthetic resin and may be provided as a means for coupling the touchpad assembly 304 to the housing 301 (e.g., the seating recess 311). For example, the touchpad assembly 304 may be disposed on the housing 301 as the fixing plate 341 is disposed or attached to the seating recess 311. In an embodiment, the fixing plate 341 may include avoidance recesses 341a respectively formed in two opposite edges (e.g., two opposite ends in the X-axis direction) and, when the fixing plate 341 is disposed in the seating recess 311, the avoidance recesses 341a may be disposed corresponding to any one of the accommodation holes 311a. In an embodiment, the avoidance recess 341a may have a shape corresponding to, or substantially identical to, the accommodation holes 311a. In an embodiment, the fixing plate 341 may include the holes 341b formed through two opposite surfaces thereof, thereby providing spaces for receiving other structures or avoiding interference with other structures. For example, the electronic components protruding from the surface of the circuit board 345 in a state in which the circuit board 345 is assembled may be at least partially received in the hole(s) 341b of the fixing plate 341.

According to an embodiment, the electronic device 300 may further include at least one adhesive member 361 in disposing or attaching the fixing plate 341. For example, the adhesive member 361 may be a double-sided tape disposed between one surface of the housing 301 and the fixing plate 341 over the seating recess 311 and may attach the fixing plate 341 to the seating recess 311 in the upper/lower directions (e.g., Z-axis direction) of FIG. 3. As described in connection with FIG. 6 or 7, the adhesive member 361 may be at least partially exposed inward of the housing 301 through the dummy hole 311b. If the portion positioned on the dummy hole 311b inside the housing 301 is pulled, the adhesive member 361 may easily be separated from the housing 301 or the fixing plate 341. For example, the adhesive member 361 may be a removable tape that provides stable adhesion in the upper/lower direction (e.g., Z-axis direction) of FIG. 3 while easily separating from the housing 301 or the fixing plate 341 by the force acting in the left/right direction (e.g., X-axis direction or Y-axis direction) of FIG. 3. In an embodiment, the removable tape may be a flexible stretchable tape. When the adhesive member 361 includes a removable tape (or stretchable tape), the touchpad assembly 304 may be easy to repair or replace. In an embodiment, the adhesive member 361 may include a heat sensitive adhesive or a pressure sensitive adhesive. The adhesive member 361 may be appropriately selected considering specifications of a product to be actually manufactured or post management.

According to an embodiment, the cover plate 343 may be formed of glass or a synthetic resin material and may be a structure substantially exposed from the outside of the electronic device 300 or the housing 301. For example, in the touchpad assembly 304, an area where the user input is substantially performed may be provided by the cover plate 343. The circuit board 345 may include various sensors (e.g., sensor(s) 345b of FIG. 10) for detecting user input, e.g., transparent electrodes, transparent leads, pressure sensors, capacitance sensors, and/or gaps) and be disposed on an inner surface (e.g., the surface facing in the –Z direction) of the cover plate 343. In an embodiment, the cover plate 343 may be coupled to the fixing plate 341 while facing the fixing plate 341, with the circuit board 345 disposed therebetween.

According to an embodiment, a plurality of cushion tapes 347 may be disposed substantially between the fixing plate 341 and the circuit board 345 to couple or attach the circuit board 345 and/or the cover plate 343 to the fixing plate 341. In an embodiment, the cushion tape 347 may include an elastic material (e.g., Poron or sponge) and be thus deformed by external force or, with no external force applied, recovered to the initial shape as manufactured. For example, when external force is applied, the cover plate 343 or the circuit board 345 may be moved close to or away from the fixing plate 341 (e.g., Z-axis direction) and/or in a direction (e.g., X-axis direction and/or Y-axis direction) parallel to the fixing plate 341, and the cushion tape(s) 347 may permit such movement. In an embodiment, as the cover plate 343 or the circuit board 345 is deformed, it may partially be moved close to or away from the fixing plate 341. The sensor disposed on the circuit board 345 may detect the gap between the cover plate 343 and the fixing plate 341 or the gap between the circuit board 345 and the fixing plate 341, and the touchpad assembly 304 or the processor (e.g., the processor 120 of FIG. 1) may determine whether there is user input based on a change in the gap.

According to an embodiment, the driving unit(s) 351 and 353 may include a first driving unit 351 disposed on the touchpad assembly 304 and a second driving unit 353 disposed on an inner surface of the housing 301, and the second driving unit 353 may be disposed to at least partially face the first driving unit 351. In an embodiment, the first driving unit 351 may receive an electrical signal to generate an electromagnetic field. The second driver 353 may include a magnetic substance. For example, an electric signal may be applied to the first driving unit 351 to generate an electromagnetic field, and the first driving unit 351 and the second driving unit 353 may generate attractive force. In an embodiment, the second driving unit 353 may include a permanent magnet and, in this case, when an electric signal is applied to the first driving unit 351, the first driving unit 351 and the second driving unit 353 may alternately generate attractive forces and repulsive forces. The attractive or repulsive force generated by the first driving unit 351 and the second driving unit 353 may act as a driving force for vibrating the touchpad assembly 304. In an embodiment, "vibration of the touchpad assembly 304" may be interpreted as, e.g., the movement of the cover plate 343 or the circuit board 345 relative to the fixing plate 341 or relative to the housing 301.

According to an embodiment, the electronic device 300 may include at least one support piece 345a. The first driving unit 351 may be assembled to the circuit board 345 through the support piece(s) 345a. For example, support pieces 345a may be provided at two opposite ends, respectively, of the first driving unit 351. The first driving unit 351 may be fixed to the circuit board 345 by a fastening member, such as a screw. According to an embodiment, the support piece(s) 345a may be omitted. Considering a fixing structure or an insulating structure, other components similar to the support piece(s) 345a may be further provided at two opposite ends of the first driving unit 351. In an embodiment, the first driving unit 351 on the touchpad assembly 304 may be partially positioned on the avoidance recess 341a.

According to an embodiment, when the touchpad assembly 304 is assembled to the seating recess 311, the first driving unit 351 may be partially received in the accommodation hole 311a and disposed inside the housing 301. The second driving unit 353 disposed on the inner surface of the housing 301 may be substantially positioned adjacent to the accommodation hole 311a and thus at least partially face the first driving unit 351. For example, if an electric signal is applied to the first driving unit 351, an attractive or repulsive force may be generated between the first driving unit 351 and the second driving unit 353, moving the cover plate 343 with respect to the fixed plate 341. In an embodiment, the second driving unit 353 may have a plate or bar shape and be bonded or fixed to the inner surface of the housing 301.

According to an embodiment, a recess (e.g., the seating recess 311) having a certain depth may be formed in the housing 301 to receive the touchpad assembly 304, making it easy to dispose the touchpad assembly 304. For example, as the touchpad assembly 304 is disposed to provide a convenient input environment, it is possible to secure the strength or structural stability of the housing 301.

The configuration or arrangement of the touchpad assembly 304 and/or the driving units 351 and 353 is described below in greater detail with reference to FIGS. 4 to 11. In the following detailed description, reference may be made to the electronic devices 101, 200, and 300 of FIGS. 1 to 3, and components, which may easily be understood through the foregoing embodiments, are assigned the same reference numerals or omitted and a description thereof may be omitted.

Figure 4:
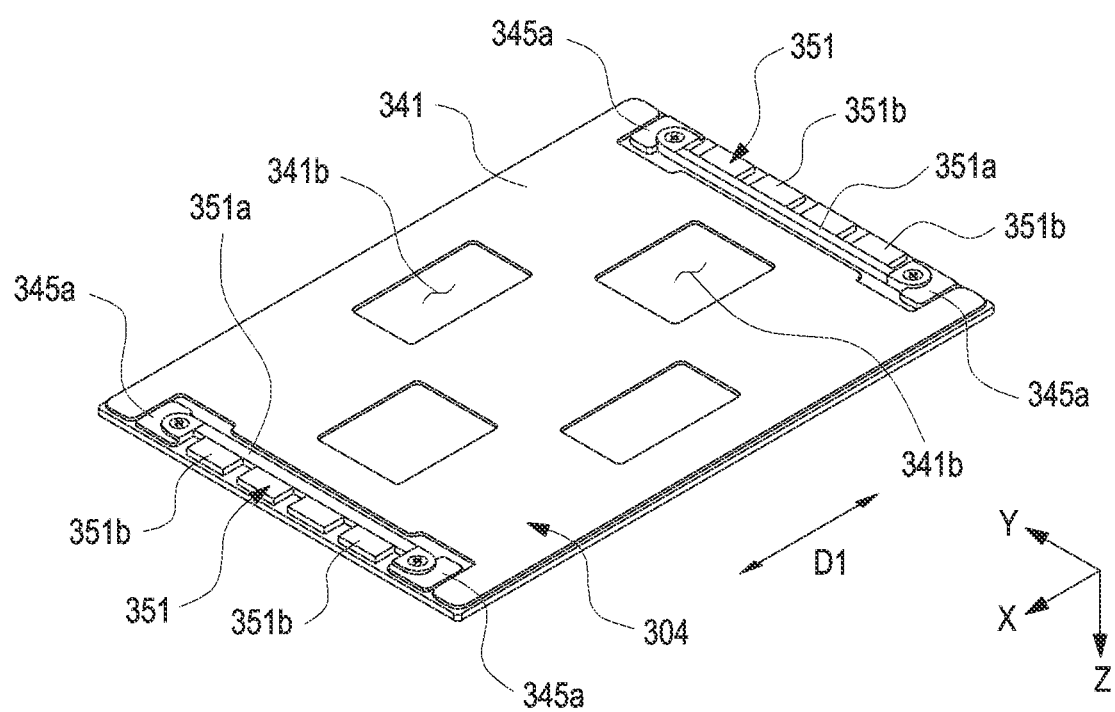
FIG. 4 is a perspective view illustrating a touchpad assembly of an electronic device according to an embodiment of the disclosure.

FIG. 4 is a perspective view illustrating a touchpad assembly 304 of an electronic device (e.g., the electronic device 300 of FIG. 3) according to an embodiment of the disclosure.

Figure 5:
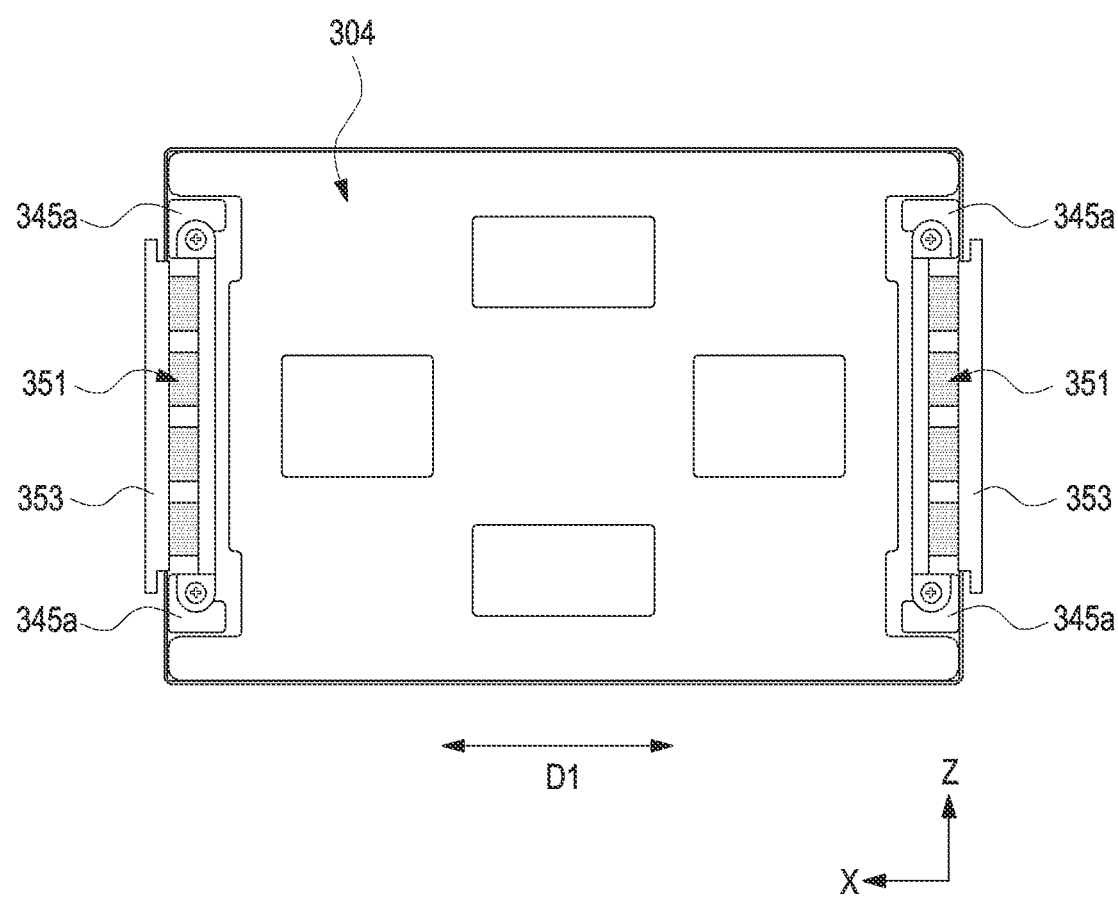
FIG. 5 is a view illustrating a disposition of a driving unit(s) in an electronic device according to an embodiment of the disclosure.

FIG. 5 is a view illustrating a disposition of a driving unit(s) 351 and 353 in an electronic device 300 according to an embodiment of the disclosure.

Referring to FIGS. 4 and 5, a pair of driving units 351, respectively, may be disposed at two opposite edges (e.g., two opposite ends in the X-axis direction) of the circuit board 345, on the inner surface of the touchpad assembly 304. For example, as viewed through one surface of the housing 301, a first driving unit(s) 351 may be disposed to substantially overlap the touchpad assembly 304 (e.g., the cover plate 343 or the circuit board 345). In an embodiment, when a plurality of first driving units 351 are provided, a plurality of second driving units 353 may be provided. For example, a pair of second driving units 353 may be disposed on the inner surface of the housing 301.

In an embodiment, the first driving unit(s) 351 may include a yoke 351a (or iron core) and at least one coil 351b formed of conductive lines wound around a portion of the yoke 351a. The coil 351b may receive an electrical signal to generate an electric field, and the yoke 351a may align the distribution or direction of the electric field generated from the coil. In an embodiment, the support piece(s) 345a may be provided substantially at two opposite ends of the yoke 351a.

According to an embodiment, when the touchpad assembly 304 is disposed on the housing 301, the first driving units 351 may be disposed substantially in the area between the second driving units 353 and be each disposed to face any one of the second driving units 353, inside the housing 301. Thus, the attractive or repulsive force generated by the first driving unit(s) 351 and the second driving unit(s) 353 may move the cover plate 343 (and/or circuit board 345) in a horizontal direction (e.g., the X-axis direction) indicated as 'D' with respect to the fixing plate 341. The cushion tape(s) 347 of FIG. 3 may permit such movement and, in a state in which no attractive or repulsive force is generated, be recovered to the initial shape, returning the cover plate 343 to the initial assembled position.

According to an embodiment, when the second driving unit 353 is a magnetic substance other than a permanent magnet, an attractive force may be generated between the first driving unit 351 and the second driving unit 353 according to the application of an electric signal. In this case, the first driving units 351 may be disposed in opposite directions (e.g., the +X direction and the −X direction) with respect to each other on the touchpad assembly 304. In an embodiment, in a state where an electric signal is applied to the left first driving unit 351, no electric signal is applied to the right first driving unit 351, and the cover plate 343 may move to the left. Conversely, in a state where an electric signal is applied to the right first driving unit 351, no electric signal is applied to the left first driving unit 351, and the cover plate 343 may move to the right. Accordingly, when generating vibration based on the user input, the processor 120 may alternately apply electrical signals to the pair of first driving units 351. For example, when the second driving unit 353 is a magnetic substance, a pair of first driving units 351 may be disposed in opposite directions with each other. The processor 120 may be configured to provide vibration feedback by alternately applying electrical signals to the first driving units 351.

According to an embodiment, when the second driving unit 353 is a permanent magnet, the first driving unit 351 and the second driving unit 353 may alternately generate attractive force and repulsive force in a state in which an electric signal is applied, moving the touchpad assembly 304 (e.g., the cover plate 343 and/or the circuit board 345) in the X-axis direction. For example, when the second driving unit 353 is a permanent magnet, appropriate vibration feedback may be provided even when one first driving unit 351 and one second driving unit 353 are provided. However, an embodiment of the disclosure is not limited thereto, and even when the second driving unit 353 is a permanent magnet, the electronic device 300 may have a complex pattern of vibration feedback by including one pair of, or more first driving units 351.

As mentioned above, the vibration feedback may be partially audibly perceived, but may be substantially tactilely perceived by the user. For example, the electronic device 300 or the processor 120 may be configured to provide vibration feedback in response to an input by direct contact with the cover plate 343. Whether or not there is a direct contact may be detected or determined by a pressure sensor or the sensor 345b of FIG. 10. However, embodiments of the disclosure are not limited thereto, and the electronic device 300 or the processor 120 may be configured to provide vibration feedback or auditory feedback in response to a user input that is not a direct contact with the cover plate 343. A configuration for providing vibration feedback is described again with reference to FIGS. 10 and 11.

Figure 6:
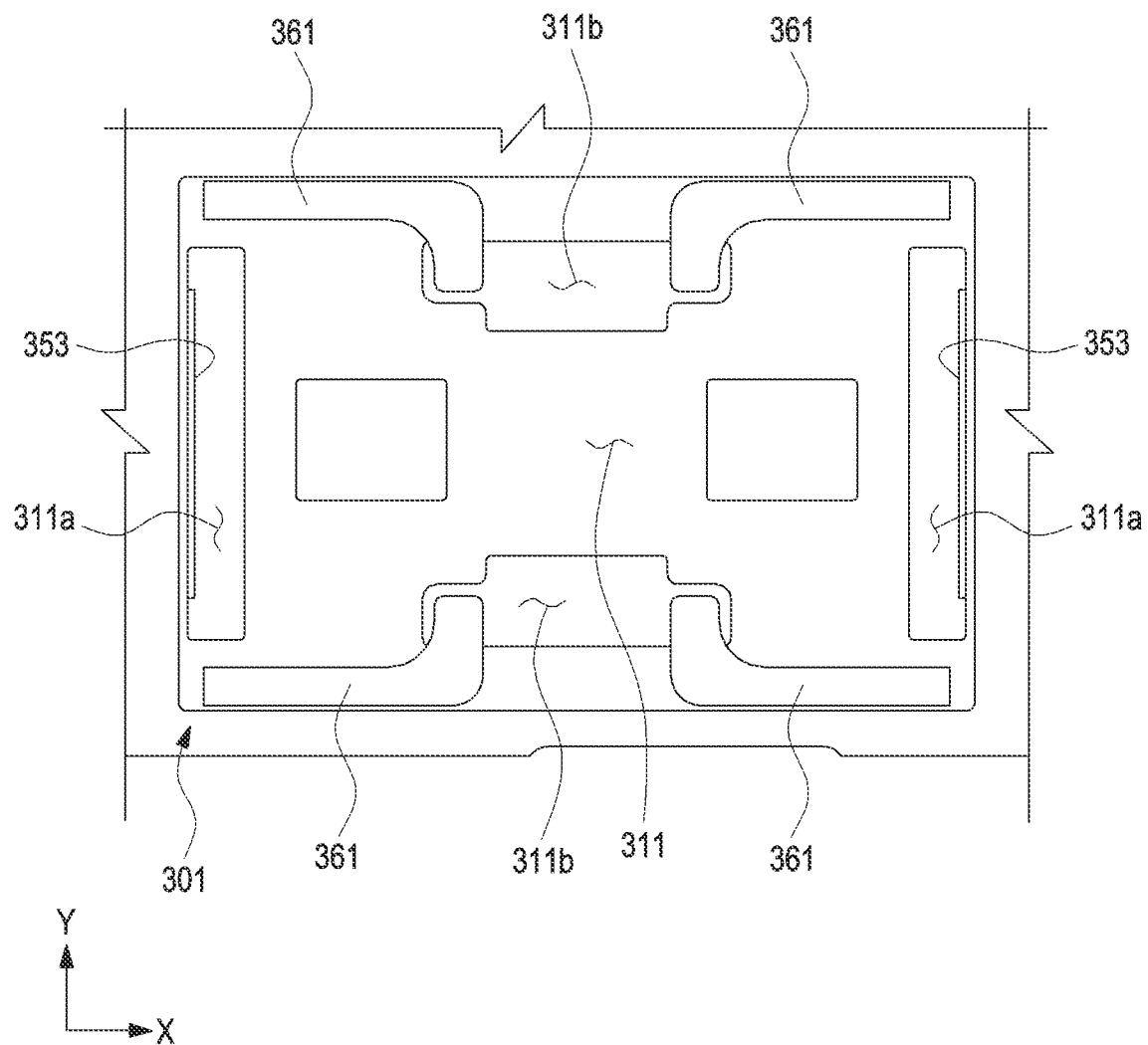
FIG. 6 is a view illustrating a disposition of an adhesive member(s) in an electronic device according to an embodiment of the disclosure.

FIG. 6 is a view illustrating a disposition of an adhesive member(s) 361 in an electronic device (e.g., the electronic device 300 of FIG. 3) according to an embodiment of the disclosure.

Figure 7:
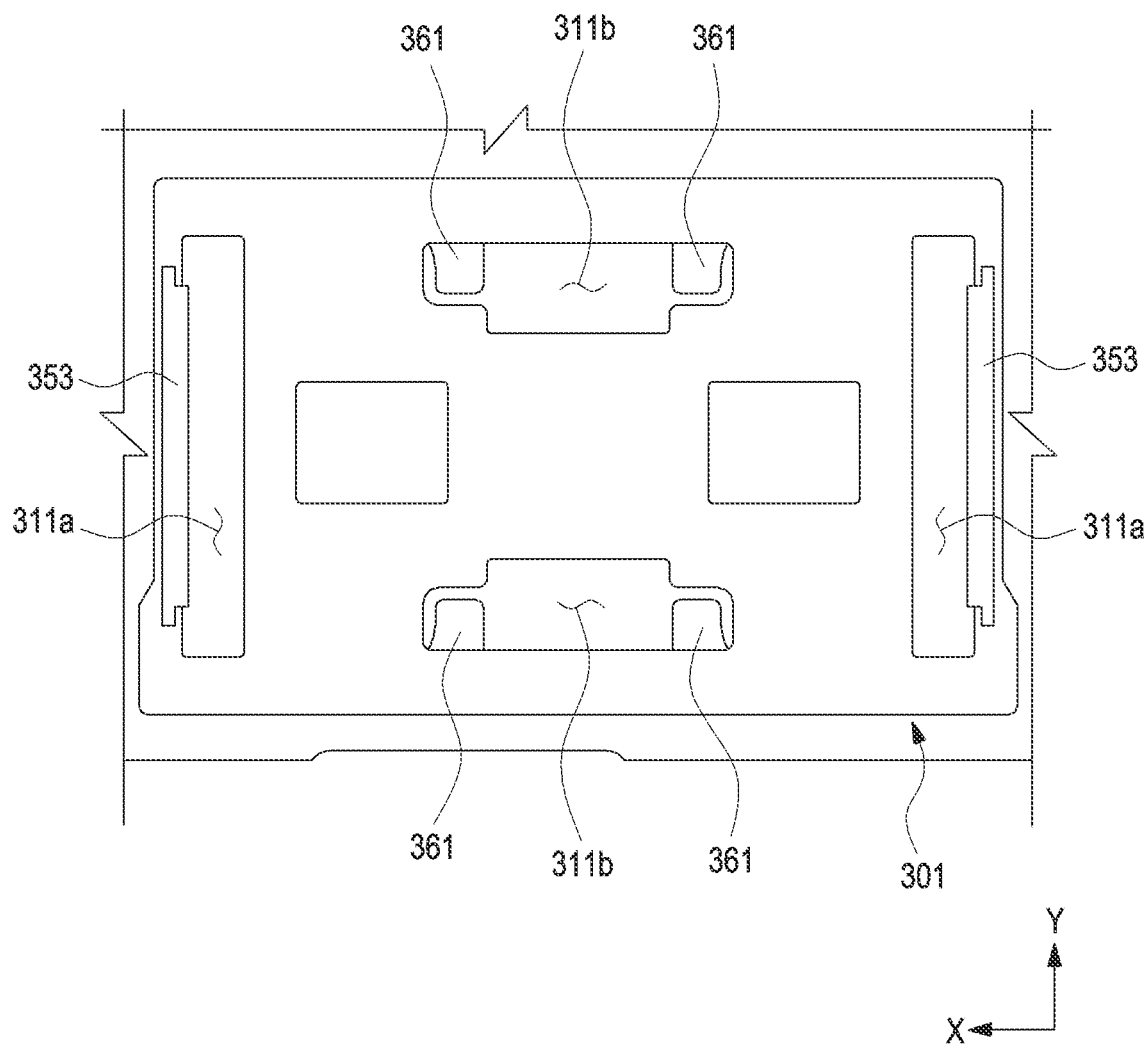
FIG. 7 is a view illustrating a disposition of an adhesive member(s) in an electronic device, as viewed in a different direction, according to an embodiment of the disclosure.

FIG. 7 is a view illustrating a disposition of an adhesive member(s) 361 in an electronic device 300, as viewed in a different direction, according to an embodiment of the disclosure.

Referring to FIGS. 6 and 7, in assembling the touchpad assembly 304 and/or the first driving unit(s) 351, the adhesive member(s) 361 disposed on the seating recess 311 on one surface of the housing 301 may be used, and the second driving unit(s) 353 may be disposed on the inner surface of the housing 301. For example, the second driving unit(s) 353 may be attached to the inner surface of the housing 301 by an adhesive in the position adjacent to any one of the accommodation holes 311a. However, an embodiment of the disclosure is not limited thereto, and the second driving unit(s) 353 may be fixed to the housing 301 by a press-fitting structure or a fastening member, such as a screw.

According to an embodiment, as viewed through one surface of the housing 301, the second driving unit(s) 353 may not substantially overlap the seating recess 311. In another embodiment, considering the rigidity of the housing 301, the position or size of the accommodation hole 311a may be different from those in the illustrated embodiment and, in this case, the second driving unit(s) 353 may at least partially overlap the seating recess 311 or be visually exposed on one surface of the housing 301 through the accommodation hole 311a. In an embodiment, if the touchpad assembly 304 is assembled, the accommodation hole 311a is substantially concealed or closed, so that "the second driving unit(s) 353 is exposed on one surface of the housing 301 through the accommodation hole 311a" may refer to a temporary state in the assembly process.

According to an embodiment, the shape and number of the adhesive member(s) 361 may be appropriately selected considering the fixing force of the fixing plate 341 or the touchpad assembly 304. In the illustrated embodiment, four adhesive members 361 may be attached to one surface of the housing 301 on the seating recess 311 and may be partially positioned corresponding to the dummy hole 311b. For example, when viewed from the inside of the housing 301, a portion of the adhesive member 361 may be visually exposed. As mentioned above, the adhesive member 361 may provide stable adhesive strength in the direction in which the fixing plate 341 or the touchpad assembly 304 is assembled (e.g., the Z-axis direction) and, when external force is applied in a direction (e.g., the X-axis direction or Y-axis direction) crossing the assembled direction of the touchpad assembly 304 or a direction (the direction indicated as 'D1' in FIG. 4) substantially parallel to one surface of the housing 301, the adhesive member 361 may easily be separated from the housing 301. For example, if a portion of the adhesive member 361 is pulled from the inside of the housing 301, the adhesive member 361 or the touchpad assembly 304 may be easily separated from the housing 301.

According to an embodiment, the assembly structure using the adhesive member 361 may facilitate repair/replacement while facilitating assembly of the touchpad assembly 304 even without using a fastening member, such as a screw. Use of a fastening member, such as a screw, requires securing of the thickness of the boss for obtaining fastening strength or the depth of the fastening hole formed in the boss and be thus an obstacle to downsizing According to an embodiment of the disclosure, the adhesive member 361 of the electronic device (e.g., the electronic devices 101, 200, and 300 of FIGS. 1 to 3) may provide a stable binding force in assembling the touchpad assembly 304 although not using a separate fastening member or boss structure and substantially eliminates formation of an opening in the area where the touchpad assembly 304 is disposed and/or, although an opening is formed, minimize the size of the opening, enhancing the rigidity of the housing 301.

Figure 8:
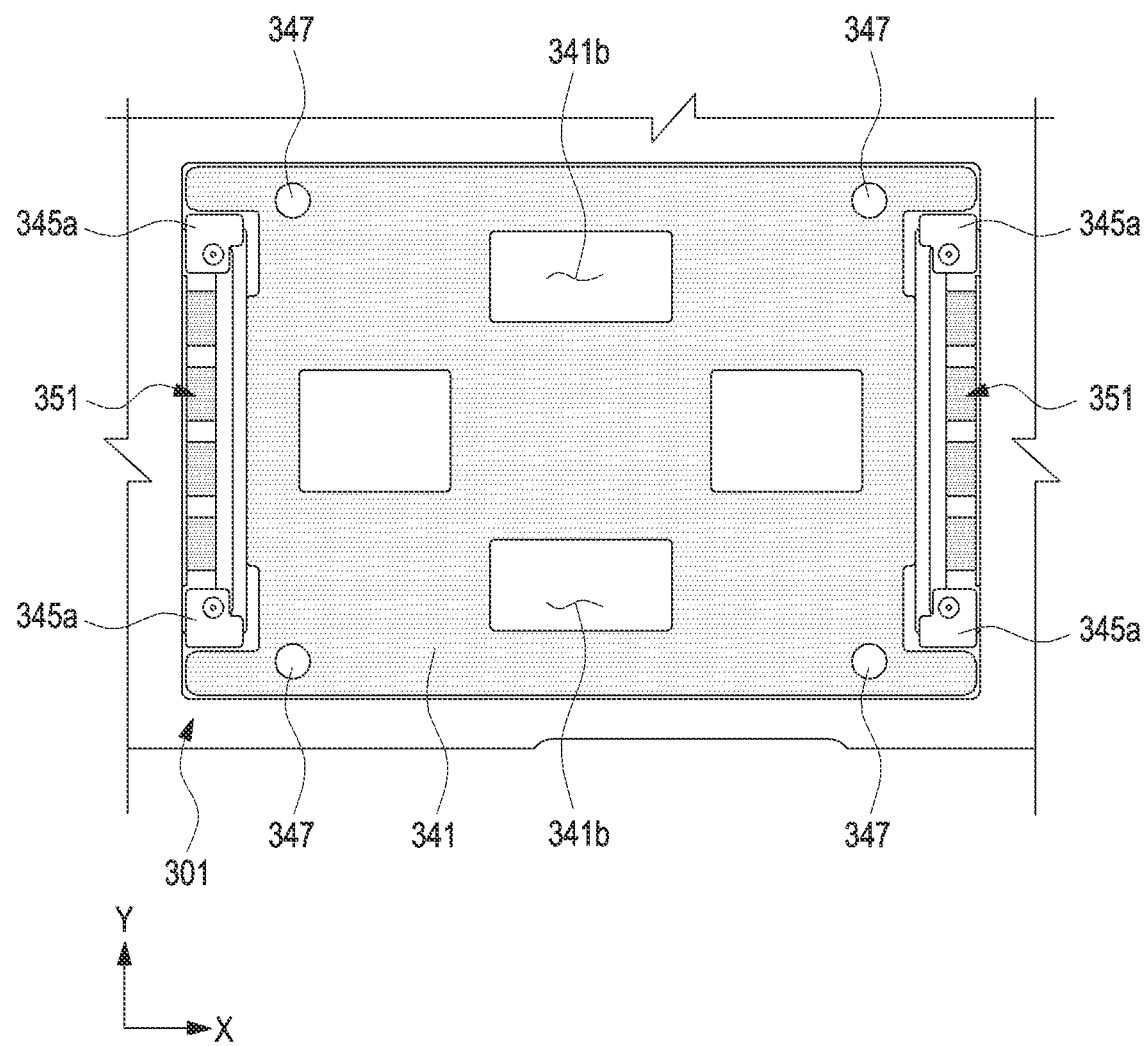
FIG. 8 is a view illustrating a disposition of a touchpad assembly in an electronic device according to an embodiment of the disclosure.

FIG. 8 is a view illustrating a disposition of a touchpad assembly 304 in an electronic device (e.g., the electronic device 300 of FIG. 3) according to an embodiment of the disclosure.

Figure 9:
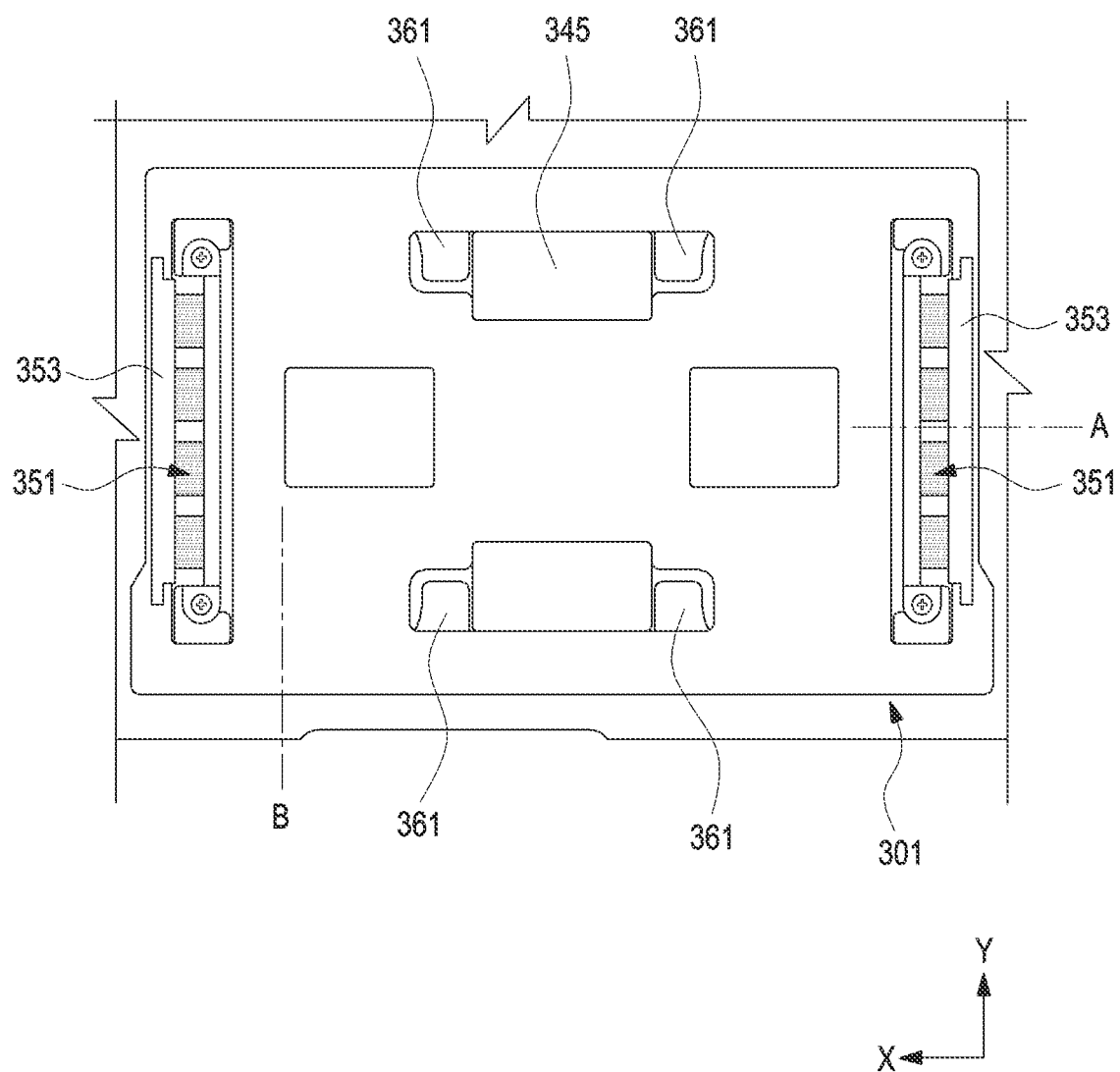
FIG. 9 is a view illustrating a disposition of a touchpad assembly in an electronic device, as viewed in a different direction, according to an embodiment of the disclosure.

FIG. 9 is a view illustrating a disposition of a touchpad assembly 304 in an electronic device 300, as viewed in a different direction, according to an embodiment of the disclosure.

Although FIG. 8 exemplifies a state in which the touchpad assembly 304 is disposed on the housing 301, it should be noted that the cover plate 343 and/or the circuit board 345 is omitted in the illustrated example. Referring to FIGS. 8 and 9, when disposed in the seating recess 311, the touchpad assembly 304 (e.g., the fixing plate 341) may be substantially attached or bonded to one surface of the housing 301 by the adhesive member 361. In a state in which the fixing plate 341 is disposed on the housing 301, the first driving unit 351 may be partially received in an accommodation hole (e.g., the accommodation hole 311a of FIG. 3) and be disposed to face any one of second driving units 353 inside the housing 301. Although not directly shown in FIGS. 8 and 9, a designated gap (e.g., the first gap g1 of FIG. 10 which is about 1 mm) may be formed between the first driving unit 351 and the second driving unit 353 in the initial assembled state, and such a gap may determine a range in which the cover plate 343 horizontally moves (e.g., moves in the direction indicated as 'D1' in FIG. 4) with respect to the fixing plate 341 or the housing 301 in vibration feedback.

Figure 10:
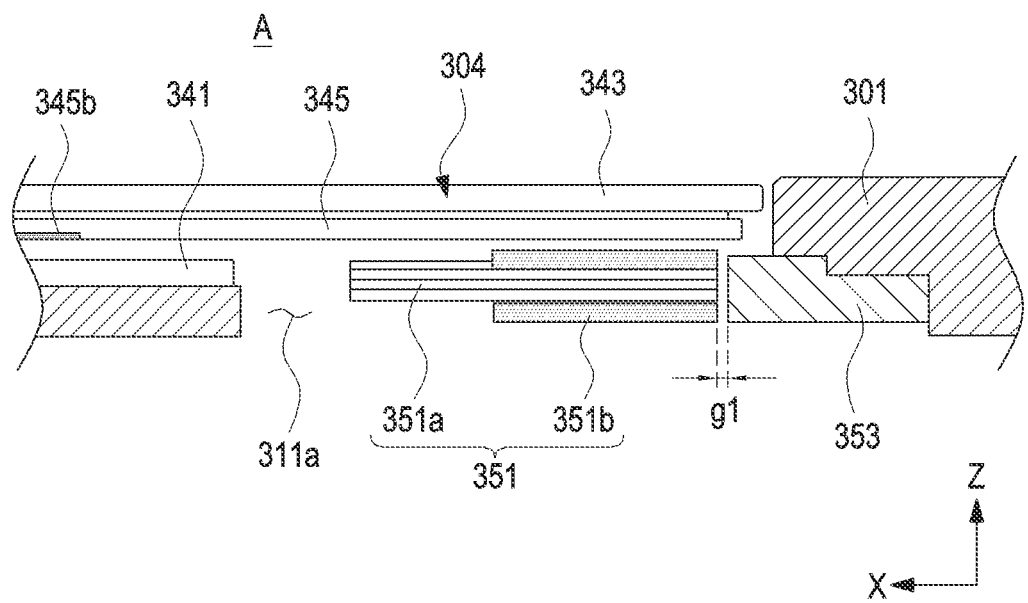
FIG. 10 is a cross-sectional view illustrating a portion of an electronic device, taken along line 'A' of FIG. 9 according to an embodiment of the disclosure.

FIG. 10 is a cross-sectional view illustrating a portion of an electronic device (e.g., the electronic device 300 of FIG. 3), taken along line 'A' of FIG. 9 according to an embodiment of the disclosure.

Figure 11:
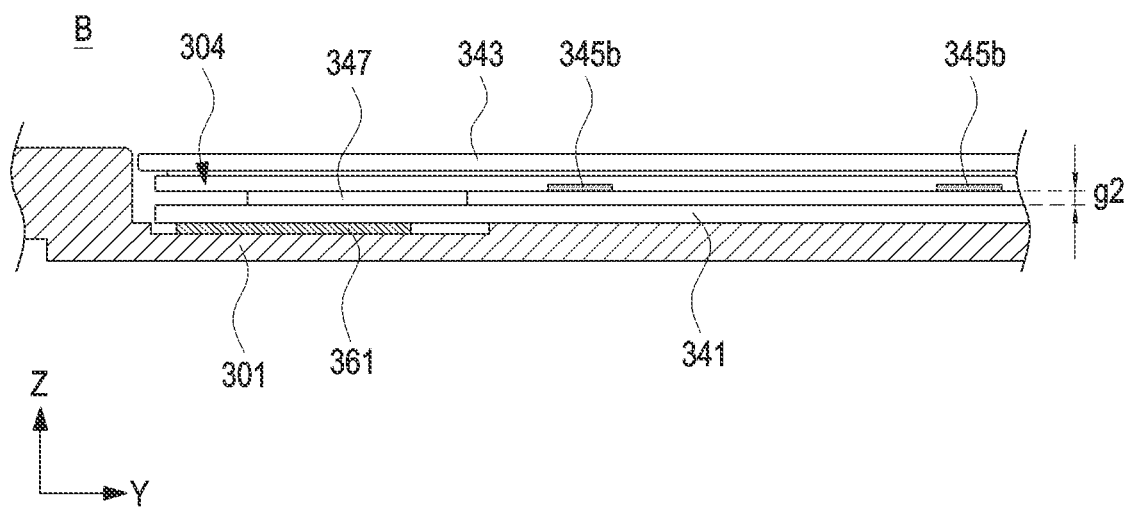
FIG. 11 is a cross-sectional view illustrating a portion of an electronic device, taken along line 'B' of FIG. 9 according to an embodiment of the disclosure.

FIG. 11 is a cross-sectional view illustrating a portion of an electronic device 300, taken along line 'B' of FIG. 9 according to an embodiment of the disclosure.

Referring to FIGS. 10 and 11, if the touchpad assembly 304 is disposed in the seating recess 311, the adhesive member 361 may attach the fixing plate 341 onto the seating recess 311 and/or one surface of the housing 301. In the state in which the touchpad assembly 304 is disposed in the seating recess 311, the first driving unit 351 (e.g., the yoke 351a and the coil 351b) may be partially received in the accommodation hole 311a (or the avoidance recess 341a of FIG. 3) and be disposed to substantially face the second driving unit 353 inside the housing 301. In the initial assembled state, a designated gap (e.g., the first gap g1 of FIG. 10) may be formed between the first driving unit 351 and the second driving unit 353, and the first gap g1 may set a range in which the cover plate 343 (and/or the circuit board 345) may move with respect to the fixing plate 341 (or housing 301).

According to an embodiment, the cushion tape 347 may couple the circuit board 345 (and/or the cover plate 343) to the fixing plate 341 while maintaining a predetermined gap (e.g., the second gap g2 of FIG. 11) between the cover plate 343 and the fixing plate 341 or between the cover plate 343 and the fixing plate 341. In an embodiment, at least one sensor 345b (e.g., a gap sensor) may be provided on the circuit board 345 to detect a change in the gap (e.g., a change in the second gap g2) between the circuit board 345 (or cover plate 343) and the fixing plate 341. In an embodiment, the cushion tape 347 may be contracted or the cover plate 343 may be deformed by the user's contact or pressure. The contraction of the cushion tape 347 or the deformation of the cover plate 343 may substantially reduce the gap between the circuit board 345 and the fixing plate 341, and such a change in the gap may be detected by the sensor 345b. For example, a 'change in the gap between the circuit board 345 and the fixing plate 341 may be substantially attributed to the contact or pressure to the cover plate 343 by the user, and a change in gap detected by the sensor 345b may be used as data for determining whether there is user input. For example, the sensor 345b may detect user input, such as contact or press on, at least, the touchpad assembly 304.

According to an embodiment, the processor (e.g., the processor 120 of FIG. 1) may be configured to determine user input based on a user input (e.g., a change in the second gap g2 detected by the sensor 345b) detected by the touchpad assembly 304 and execute a command corresponding to the user input. In an embodiment, the processor 120 may apply an electrical signal to the first driving unit 351 based on the user input. For example, when the user input is received, the first driving unit 351 (e.g., the coil 351b) may generate an electromagnetic field, and attractive or repulsive force may be generated between the first driving unit 351 and the second driving unit 353 by the generated electromagnetic field. The attractive or repulsive force generated by the first driving unit 351 and the second driving unit 353 may act as a driving force for moving or vibrating, e.g., the touchpad assembly 304 (e.g., the cover plate 343 and/or the circuit board 345). For example, the processor 120 may be configured to provide vibration feedback using the touchpad assembly 304 or the driving unit(s) 351 and 353 while executing a designated command based on the user input.

As described above, according to an embodiment of the disclosure, an electronic device (e.g., the electronic devices 101, 200, and 300 of FIGS. 1 to 3) may comprise a housing (e.g., the first housing 201 of FIG. 2 or the housing 301 of FIG. 3) including a seating recess (e.g., the seating recess 311 of FIG. 3) formed in one surface, a touchpad assembly (e.g., the touchpad 213 of FIG. 2 or the touchpad assembly 304 of FIG. 3) disposed in the seating recess on one surface of the housing and configured to detect a user input, at least one first driving unit (e.g., the first driving unit 351 of FIG. 3) disposed on the touchpad assembly and at least partially received in the housing, and a second driving unit (e.g., the second driving unit 353 of FIG. 3) disposed on an inner surface of the housing and at least partially facing the first driving unit. The first driving unit may be configured to receive an electrical signal to, together with the second driving unit, move or vibrate the touchpad assembly.

According to an embodiment, the electronic device may further comprise at least one accommodation hole (e.g., the accommodation hole 311a of FIG. 3) formed through the housing, at an edge of the seating recess. The first driving unit may be partially received in an accommodation hole of the at least one accommodation hole, and the second driving unit may be fixed to an inner surface of the housing in a position adjacent to the accommodation hole of the at least one accommodation hole.

According to an embodiment, the first driving unit may include at least one coil (e.g., the coil 351b of FIG. 10), and the second driving unit may include a magnetic substance.

According to an embodiment, a pair of first driving units may be disposed in opposite directions with each other. A plurality of second driving units may be disposed, with the pair of first driving units disposed therebetween. Each of the pair of second driving units may be disposed to face any one of the pair of first driving units.

According to an embodiment, the electronic device may further comprise a processor (e.g., the processor 120 of FIG. 1) configured to alternately apply an electrical signal to the pair of first driving units based on a user input detected by the touchpad assembly.

According to an embodiment, the touchpad assembly may include a fixing plate (e.g., the fixing plate 341 of FIG. 3) attached to the seating recess, a cover plate (e.g., the cover plate 343 of FIG. 3) movably disposed on the fixing plate, and a circuit board (e.g., the circuit board 345 of FIG. 3) disposed on an inner surface of the cover plate. The cover plate may be exposed through one surface of the housing.

According to an embodiment, the touchpad assembly may further include a plurality of cushion tapes (e.g., the cushion tape 347 of FIG. 3) disposed between the circuit board and the fixing plate to attach the cover plate or the circuit board to the fixing plate. The plurality of cushion tapes may be configured to allow the cover plate or the circuit board to move or vibrate with respect to the fixing plate based on an attractive or repulsive force generated by the first driving unit or the second driving unit.

According to an embodiment, the electronic device may further comprise at least one dummy hole (e.g., the dummy hole 311b of FIG. 3) formed through the housing, on the seating recess and at least one adhesive member (e.g., the adhesive member 361 of FIG. 3) disposed on one surface of the housing on the seating recess and having a portion exposed to an inside of the housing through the dummy hole. The adhesive member may attach or fix the fixing plate to the seating recess.

According to an embodiment, the touchpad assembly may further include at least one avoidance recess (e.g., the avoidance recess 341a of FIG. 3) formed in the fixing plate and at least one support piece (e.g., the support piece 345a of FIG. 3) disposed on the circuit board. The first driving unit may be partially received in the avoidance recess while being fixed to the circuit board through the support piece.

According to an embodiment, the electronic device may further comprise at least one accommodation hole formed through the housing at an edge of the seating recess, and corresponding to the avoidance recess. The first driving unit may be partially received in an accommodation hole of the at least one accommodation hole, and the second driving unit may be fixed to an inner surface of the housing in a position adjacent to the accommodation hole of the at least one accommodation hole.

According to an embodiment, the electronic device may further comprise a processor and at least one sensor (e.g., the sensor 345b of FIG. 10 or 11) disposed on the fixing plate or the circuit board and configured to detect a change in gap (e.g., change in the second gap g2 of FIG. 11) between the fixing plate and the circuit board. The processor may be configured to apply an electrical signal to the first driving unit based on the change in gap detected by the sensor or a user input detected by the touchpad assembly.

According to an embodiment, the electronic device may further comprise at least one dummy hole formed through the housing, on the seating recess and at least one adhesive member disposed on one surface of the housing on the seating recess and having a portion exposed to an inside of the housing through the dummy hole. The adhesive member may attach or fix the touchpad assembly to the seating recess.

According to an embodiment, the touchpad assembly may include a fixing plate attached or fixed to the seating recess by the adhesive member and a cover plate movably disposed on the fixing plate. The cover plate may be configured to move or vibrate with respect to the fixing plate based on an attractive or repulsive force generated by the first driving unit or the second driving unit.

According to an embodiment, the electronic device may further comprise a second housing (e.g., the second housing 202 of FIG. 2) including a display (e.g., the display device 221 of FIG. 2) disposed on one surface and rotatably coupled to the housing. The second housing may rotate with respect to the housing to conceal or open the touchpad assembly.

According to an embodiment, the electronic device may further comprise a keyboard (e.g., the keyboard 211 of FIG. 2 or the keyboard area 313 of FIG. 3) disposed on one side of the seating recess, on one surface of the housing.

According to an embodiment of the disclosure, an electronic device (e.g., the electronic devices 101, 200, and 300 of FIGS. 1 to 3) may comprise a first housing (e.g., the first housing 201 of FIG. 2 or the housing 301 of FIG. 3) including a seating recess (e.g., the seating recess 311 of FIG. 3) formed in one surface, a second housing (e.g., the second housing 202 of FIG. 2) including a display (e.g., the display device 221 of FIG. 2) disposed on one surface and rotatably coupled to the first housing to open/close one surface of the first housing, a touchpad assembly (e.g., the touchpad 213 of FIG. 2 or the touchpad assembly 304 of FIG. 3) disposed in the seating recess on one surface of the first housing and configured to detect a user input, a first driving unit (e.g., the first driving unit 351 of FIG. 3) disposed on the touchpad assembly and including at least one coil (e.g., the coil 351b of FIG. 10) at least partially received in the first housing, a second driving unit (e.g., the second driving unit 353 of FIG. 3) including a magnetic substance and disposed on an inner surface of the first housing to at least partially face the first driving unit, and a processor (e.g., the processor 120 of FIG. 1) configured to apply an electrical signal to the first driving unit based on a user input detected by the touchpad assembly. The first driving unit may be configured to receive an electrical signal to, together with the second driving unit, move or vibrate the touchpad assembly.

According to an embodiment, the electronic device may further comprise at least one accommodation hole (e.g., the accommodation hole 311a of FIG. 3) formed through the first housing, at an edge of the seating recess. The first driving unit may be partially received in an accommodation hole of the at least one accommodation hole, and the second driving unit may be fixed to an inner surface of the first housing in a position adjacent to the accommodation hole of the at least one accommodation hole.

According to an embodiment, the touchpad assembly may include a fixing plate (e.g., the fixing plate 341 of FIG. 3) attached to the seating recess, a cover plate (e.g., the cover plate 343 of FIG. 3) exposed through one surface of the first housing and movably disposed on the fixing plate, a circuit board (e.g., the circuit board 345 of FIG. 3) disposed on an inner surface of the cover plate, and a plurality of cushion tapes (e.g., the cushion tape 347 of FIG. 3) disposed between the circuit board and the fixing plate to attach the cover plate or the circuit board to the fixing plate. The plurality of cushion tapes may be configured to allow the cover plate or the circuit board to move or vibrate with respect to the fixing plate based on an attractive or repulsive force generated by the first driving unit or the second driving unit.

According to an embodiment, the touchpad assembly may further include at least one avoidance recess (e.g., the avoidance recess 341a of FIG. 3) formed in the fixing plate and at least one support piece (e.g., the support piece 345a of FIG. 3) disposed on the circuit board. The first driving unit may be partially received in the avoidance recess while being fixed to the circuit board through the support piece.

According to an embodiment, the electronic device may further comprise at least one accommodation hole formed through the first housing, at an edge of the seating recess, and corresponding to the avoidance recess. The first driving unit may be partially received in an accommodation hole of the at least one accommodation hole, and the second driving unit may be fixed to an inner surface of the first housing in a position adjacent to the accommodation hole of the at least one accommodation hole.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a housing including a seating recess formed in one surface;
    an accommodation hole formed through the housing at an edge of the seating recess;
    a touchpad assembly disposed in the seating recess on the one surface of the housing and configured to detect a user input;
    a first driving unit disposed on the touchpad assembly and at least partially received the accommodation hole; and
    a second driving unit disposed on an inner surface of the housing in a position adjacent to the accommodation hole and facing the first driving unit,
    wherein, when the first driving unit receives an electrical signal, the first driving unit and the second driving unit is configured to alternately generate attractive forces and repulsive forces to move or vibrate the touchpad assembly.

2. The electronic device of claim 1,
    wherein the first driving unit includes a coil, and
    wherein the second driving unit includes a magnetic substance.

3. The electronic device of claim 2,
    wherein the electronic device comprises a pair of the first driving units,
    wherein the pair of first driving units are disposed in opposite directions with each other, and
    wherein the electronic device comprises a pair of the second driving units,
    wherein the pair of second driving units are disposed with the pair of first driving units disposed therebetween, and
    wherein each of the pair of second driving units is disposed to face corresponding one of the pair of first driving units.

4. The electronic device of claim 3, further comprising:
    a processor configured to alternately apply an electrical signal to the pair of first driving units based on a user input detected by the touchpad assembly.

5. The electronic device of claim 1,
    wherein the touchpad assembly includes:
        a fixing plate attached to the seating recess;
        a cover plate movably disposed on the fixing plate; and
        a circuit board disposed on an inner surface of the cover plate, and
    wherein the cover plate is exposed through the one surface of the housing.

6. The electronic device of claim 5,
    wherein the touchpad assembly further includes a plurality of cushion tapes disposed between the circuit board and the fixing plate to attach the cover plate or the circuit board to the fixing plate, and
    wherein the plurality of cushion tapes are configured to allow the cover plate or the circuit board to move or vibrate with respect to the fixing plate based on the attractive or repulsive forces generated by the first driving unit or the second driving unit.

7. The electronic device of claim 5, further comprising:
    a dummy hole formed through the housing on the seating recess; and
    an adhesive member disposed on the one surface of the housing on the seating recess and having a portion exposed to an inside of the housing through the dummy hole,
    wherein the adhesive member attaches or fixes the fixing plate to the seating recess.

8. The electronic device of claim 5,
    wherein the touchpad assembly further includes an avoidance recess formed in the fixing plate and a support piece disposed on the circuit board, and
    wherein the first driving unit is partially received in the avoidance recess while being fixed to the circuit board through the support piece.

9. The electronic device of claim 8,
    wherein the accommodation hole is disposed to correspond to the avoidance recess.

10. The electronic device of claim 5, further comprising:
a processor; and a sensor disposed on the fixing plate or the circuit board and configured to detect a change in gap between the fixing plate and the circuit board, wherein the processor is configured to apply an electrical signal to the first driving unit based on the change in gap detected by the sensor or a user input detected by the touchpad assembly.

11. The electronic device of claim 1, further comprising:
a dummy hole formed through the housing, on the seating recess; and
an adhesive member disposed on the one surface of the housing on the seating recess and having a portion exposed to an inside of the housing through the dummy hole,
wherein the adhesive member attaches or fixes the touchpad assembly to the seating recess.

12. The electronic device of claim 11,
wherein the touchpad assembly includes a fixing plate attached or fixed to the seating recess by the adhesive member and a cover plate movably disposed on the fixing plate, and
wherein the cover plate is configured to move or vibrate with respect to the fixing plate based on the attractive or repulsive forces generated by the first driving unit or the second driving unit.

13. The electronic device of claim 1, further comprising:
a second housing including a display disposed on one surface and rotatably coupled to the housing,
wherein the second housing rotates with respect to the housing to conceal or open the touchpad assembly.

14. The electronic device of claim 13, further comprising a keyboard disposed on one side of the seating recess, on one surface of the housing.

15. An electronic device comprising:
a first housing including a seating recess formed in one surface;
a second housing including a display disposed on one surface and rotatably coupled to the first housing to open/close one surface of the first housing;
a touchpad assembly disposed in the seating recess on one surface of the first housing and configured to detect a user input;
a first driving unit disposed on the touchpad assembly and including at least one coil at least partially received in the first housing;
a second driving unit including a magnetic substance and disposed on an inner surface of the first housing to at least partially face the first driving unit; and
a processor configured to apply an electrical signal to the first driving unit based on a user input detected by the touchpad assembly,
wherein the first driving unit is configured to receive an electrical signal to, together with the second driving unit, move or vibrate the touchpad assembly.

16. The electronic device of claim 15, further comprising:
at least one accommodation hole formed through the first housing, at an edge of the seating recess,
wherein the first driving unit is partially received in one of the at least one accommodation hole, and
wherein the second driving unit is fixed to an inner surface of the first housing in a position adjacent to the one of the at least one accommodation hole.

17. The electronic device of claim 15,
wherein the touchpad assembly includes:
a fixing plate attached to the seating recess;
a cover plate exposed through one surface of the first housing and movably disposed on the fixing plate;
a circuit board disposed on an inner surface of the cover plate; and
a plurality of cushion tapes disposed between the circuit board and the fixing plate to attach the cover plate or the circuit board to the fixing plate, and
wherein the plurality of cushion tapes are configured to allow the cover plate or the circuit board to move or vibrate with respect to the fixing plate based on an attractive or repulsive force generated by the first driving unit or the second driving unit.

18. The electronic device of claim 17,
wherein the touchpad assembly further includes at least one avoidance recess formed in the fixing plate and at least one support piece disposed on the circuit board, and
wherein the first driving unit is partially received in the avoidance recess while being fixed to the circuit board through the support piece.

19. The electronic device of claim 18, further comprising:
at least one accommodation hole formed through the first housing, at an edge of the seating recess, and corresponding to the avoidance recess,
wherein the first driving unit is partially received in an accommodation hole of the at least one accommodation hole, and
wherein the second driving unit is fixed to an inner surface of the first housing in a position adjacent to the accommodation hole of the at least one accommodation hole.

* * * * *